US011404912B2

(12) United States Patent
Ichikawa et al.

(10) Patent No.: US 11,404,912 B2
(45) Date of Patent: Aug. 2, 2022

(54) POWER RECEPTION UNIT, POWER TRANSMISSION UNIT, AND WIRELESS POWER TRANSFER DEVICE

(71) Applicant: Hitachi, Ltd., Tokyo (JP)

(72) Inventors: Katsuei Ichikawa, Tokyo (JP); Yoshikazu Sugiyama, Tokyo (JP); Yasuo Yahagi, Tokyo (JP); Takatoshi Shirosugi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 36 days.

(21) Appl. No.: 16/783,892

(22) Filed: Feb. 6, 2020

(65) Prior Publication Data
US 2020/0259370 A1    Aug. 13, 2020

(30) Foreign Application Priority Data
Feb. 12, 2019  (JP) .............. JP2019-022720

(51) Int. Cl.
*H02J 50/12* (2016.01)
*H02J 50/80* (2016.01)
(Continued)

(52) U.S. Cl.
CPC .............. *H02J 50/12* (2016.02); *B60L 53/38* (2019.02); *H02J 50/40* (2016.02); *H02J 50/80* (2016.02); *H02J 50/90* (2016.02); *H04B 5/0075* (2013.01)

(58) Field of Classification Search
None
See application file for complete search history.

(56) References Cited

U.S. PATENT DOCUMENTS 3,758,845 A   9/1973  MacKelvie et al.
5,621,287 A * 4/1997  Dossot .................. H01J 29/701
                                                            315/399
(Continued)

FOREIGN PATENT DOCUMENTS

JP     2013-34140 A    2/2013
JP     2016-63683 A    4/2016
(Continued)

OTHER PUBLICATIONS

Extended European Search Report issued in European Application No. 20154626.4 dated May 25, 2020 (nine (9) pages).
(Continued)

*Primary Examiner* — Daniel Kessie
(74) *Attorney, Agent, or Firm* — Crowell & Moring LLP

(57) ABSTRACT

Provided is a power reception unit that receives electric power transmitted from a power transmission unit, in which variation in power transmission efficiency is prevented. The power reception unit includes: a plurality of power reception coils that are configured to receive electric power by magnetic coupling with a power transmission coil of the power transmission unit; and a load coil that is disposed close to the power reception coils, in which a plurality of series resonant circuits that resonate at a frequency equal to a power transmission frequency are constituted by each of the plurality of power reception coils and a resonance capacity, the plurality of series resonant circuits are connected in series in a loop shape, and the load coil extracts received electric power from the series resonant circuits.

3 Claims, 14 Drawing Sheets

(51) Int. Cl.
*H02J 50/90* (2016.01)
*H02J 50/40* (2016.01)
*B60L 53/38* (2019.01)
*H04B 5/00* (2006.01)

(56) References Cited

U.S. PATENT DOCUMENTS

| | | | | |
|---|---|---|---|---|
| 6,047,214 A * | 4/2000 | Mueller | ............ | H02J 7/00034 |
| | | | | 607/61 |
| 10,044,195 B2 * | 8/2018 | Tsukuda | ................ | H02J 5/005 |
| 2010/0264747 A1 | 10/2010 | Hall et al. | | |
| 2012/0235508 A1 * | 9/2012 | Ichikawa | ............ | H04B 5/0093 |
| | | | | 307/104 |
| 2012/0249396 A1 * | 10/2012 | Parsche | ............... | H01Q 21/061 |
| | | | | 343/866 |
| 2012/0318586 A1 | 12/2012 | Atarashi | | |
| 2013/0175872 A1 | 7/2013 | Simon et al. | | |
| 2016/0056639 A1 * | 2/2016 | Mao | ....................... | H02J 5/005 |
| | | | | 307/104 |
| 2016/0141899 A1 * | 5/2016 | Oo | ....................... | H02J 7/0044 |
| | | | | 320/108 |
| 2016/0308403 A1 | 10/2016 | Bluvshtein et al. | | |
| 2016/0344196 A1 | 11/2016 | Ahmad et al. | | |
| 2018/0233958 A1 | 8/2018 | Peralta et al. | | |

FOREIGN PATENT DOCUMENTS

| | | |
|---|---|---|
| JP | 2016-197965 A | 11/2016 |
| WO | WO 2018/163169 A1 | 9/2018 |

OTHER PUBLICATIONS

Japanese-language Office Action issued in Japanese Application No. 2019-022720 dated Apr. 12, 2022 with English translation (12 pages).

* cited by examiner

[FIG. 1]
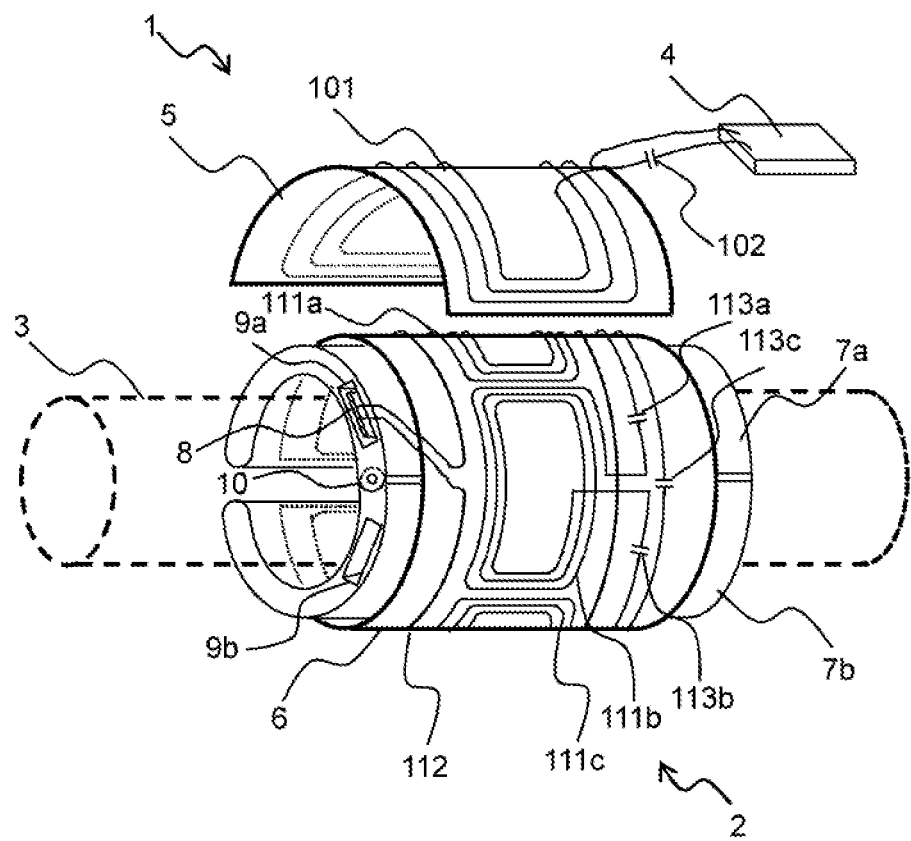

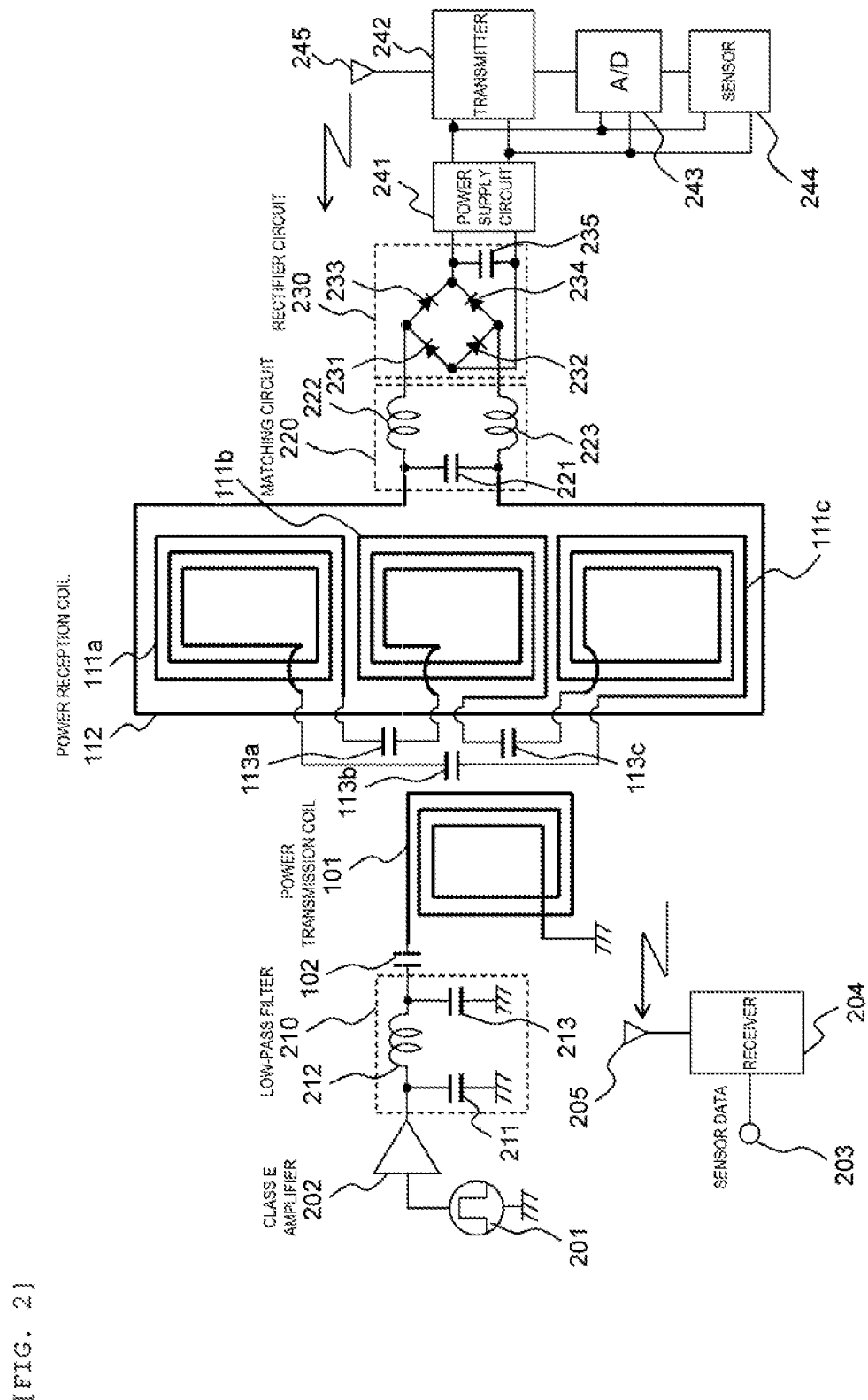
[FIG. 2]

[FIG. 3]
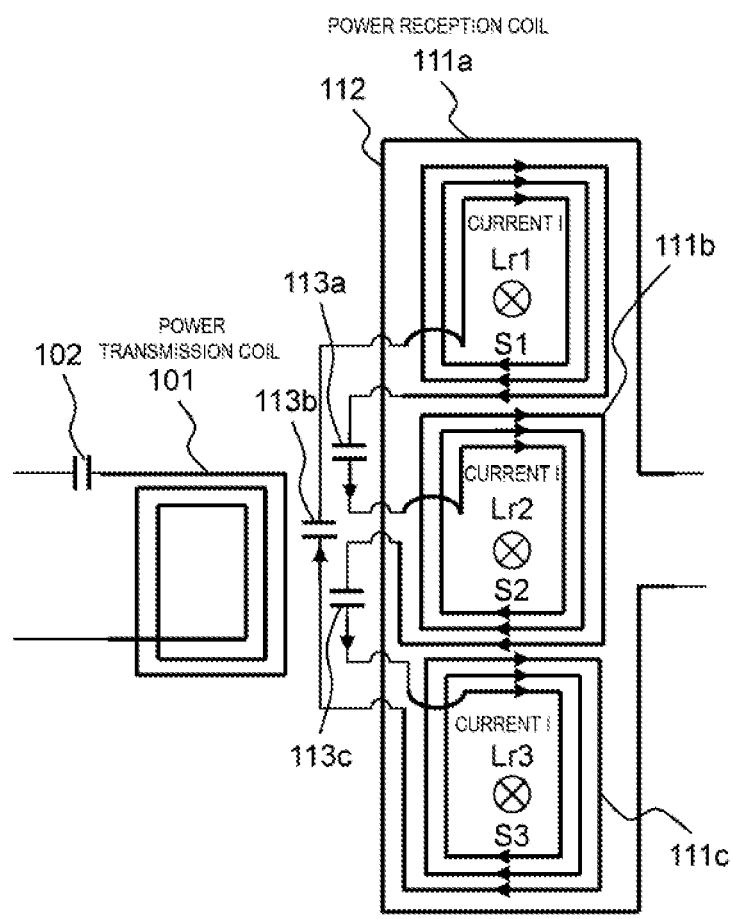

[FIG. 4]
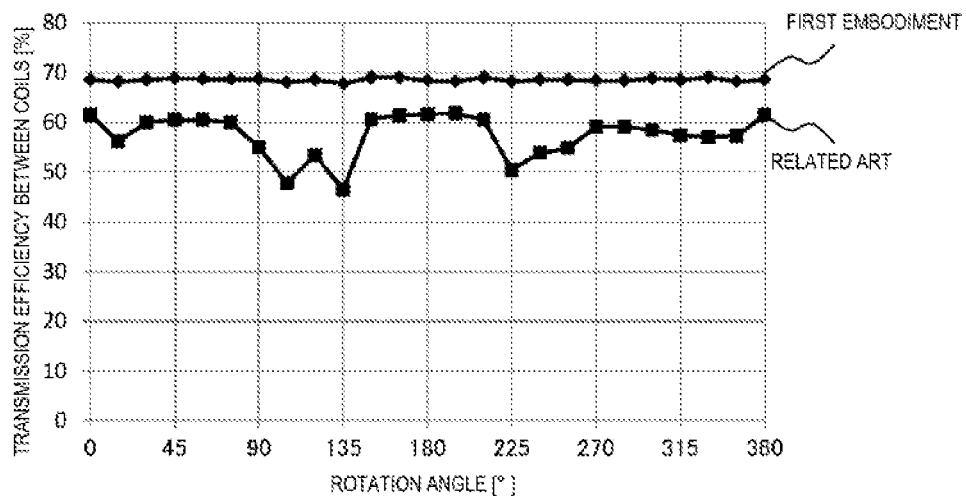
[FIG. 5]
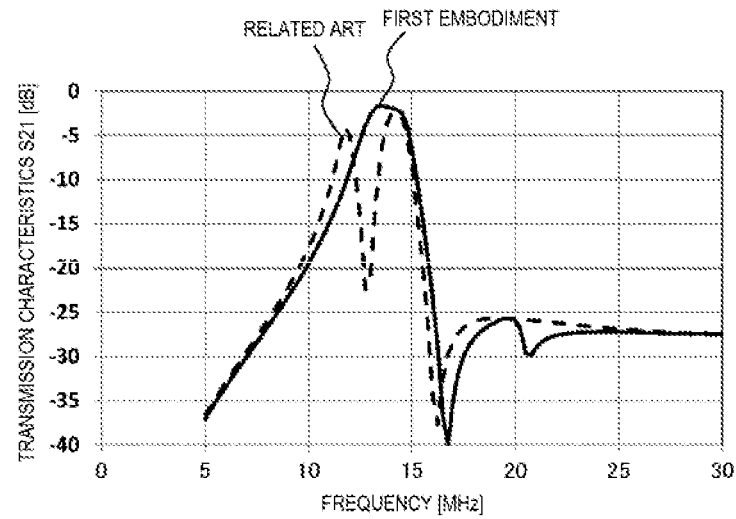

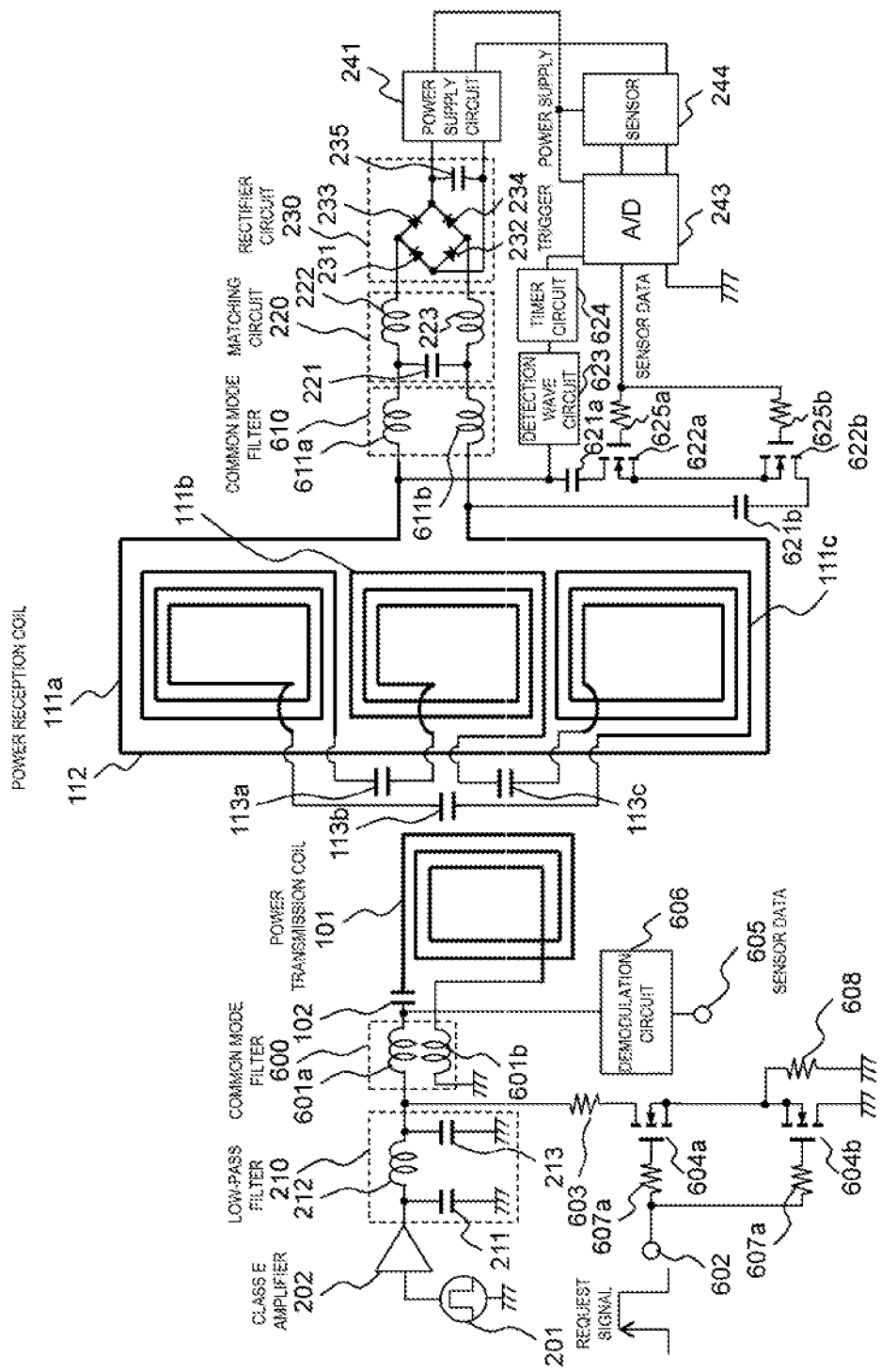
[FIG. 6]

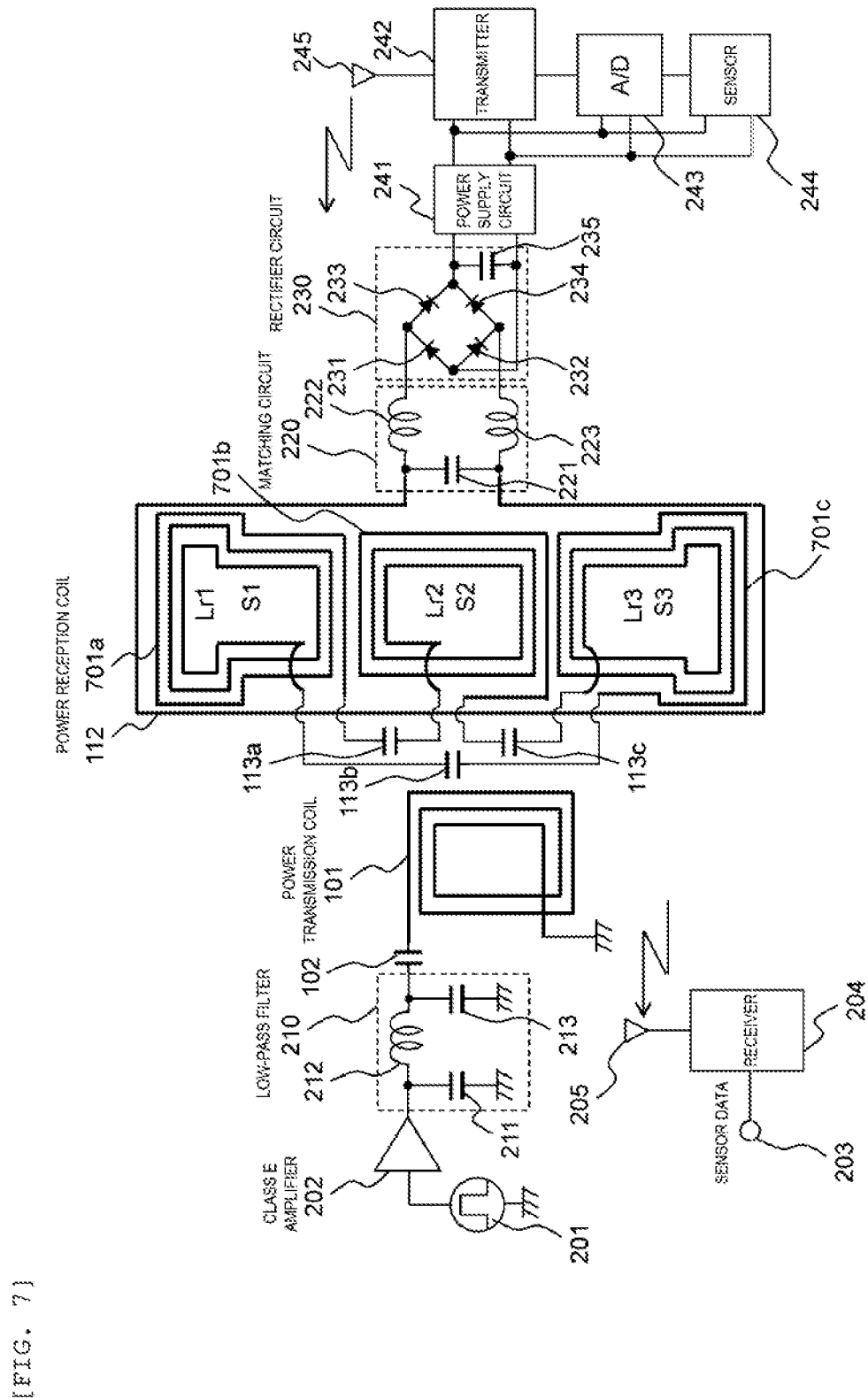
[FIG. 7]

[FIG. 8]
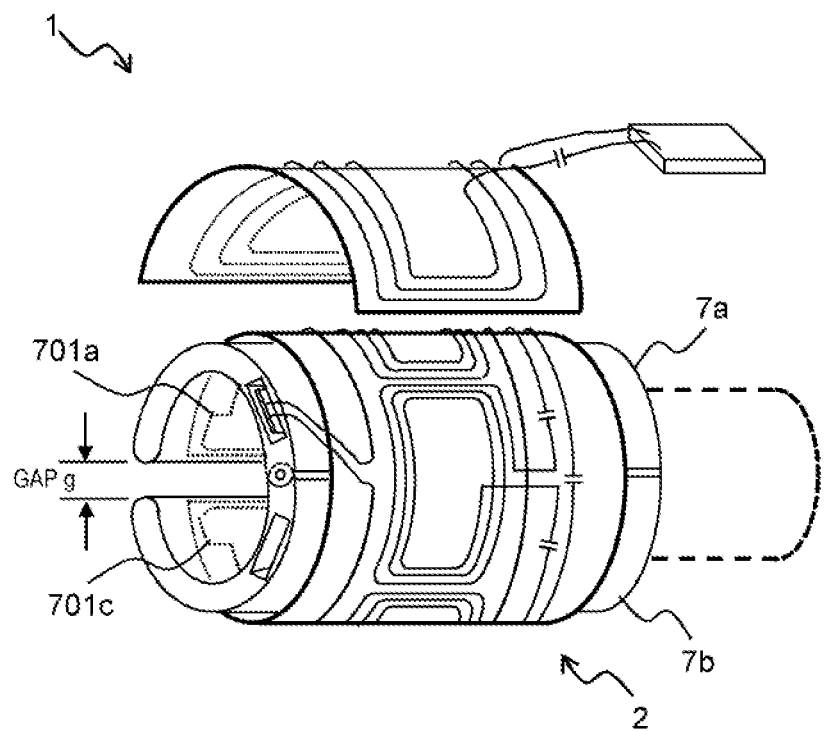

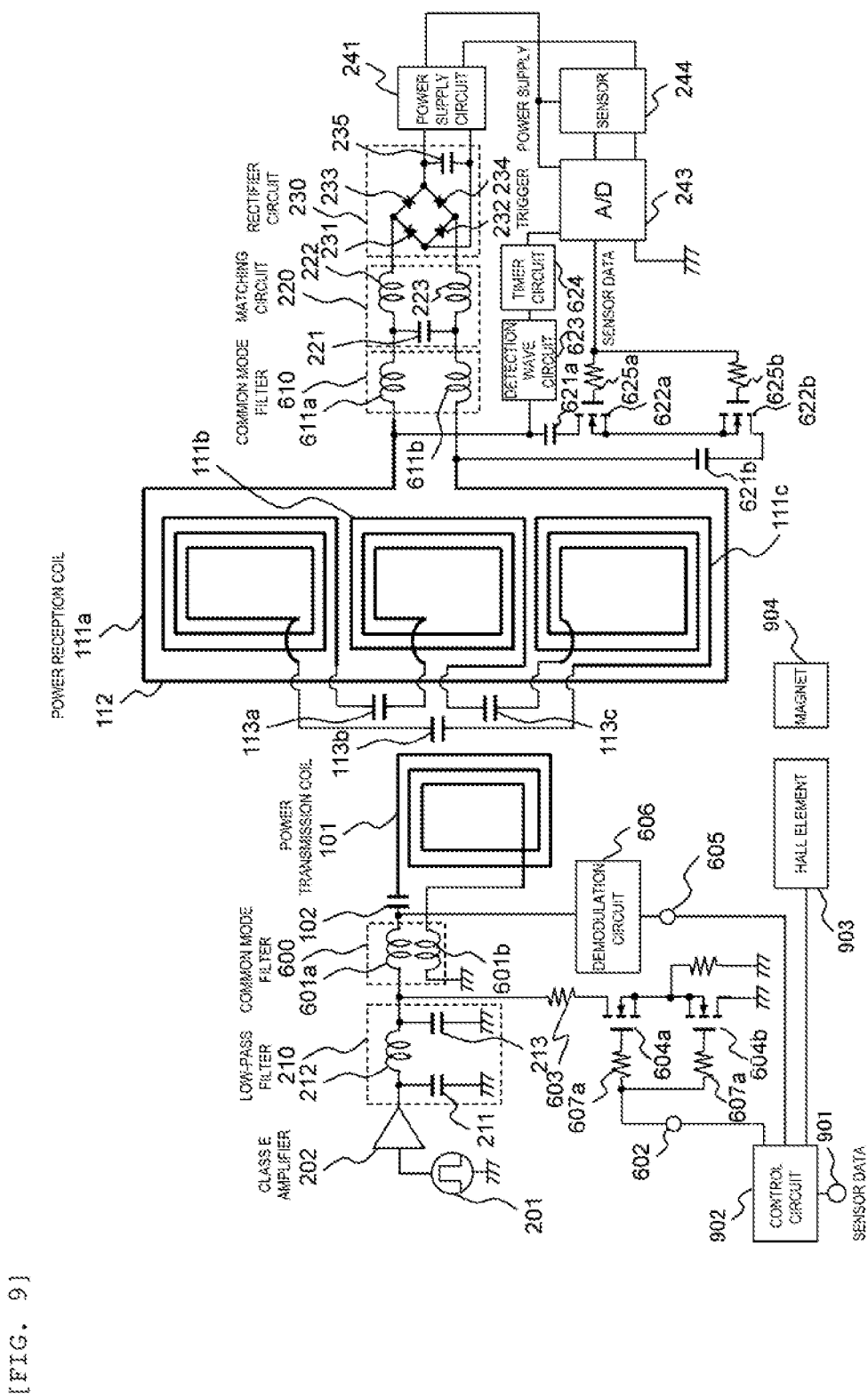
[FIG. 9]

[FIG. 10]
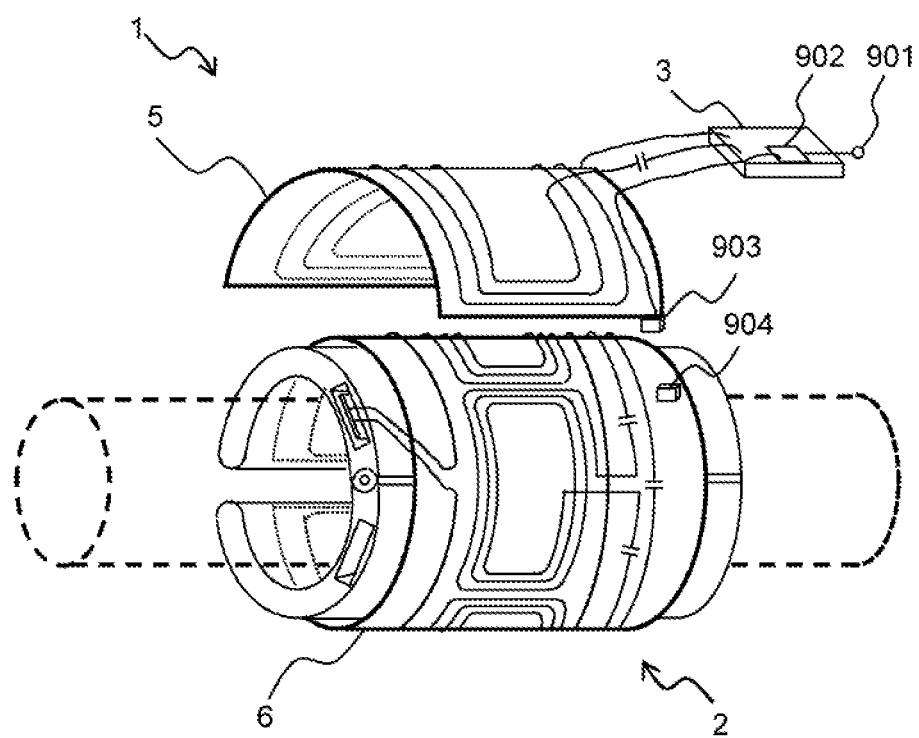

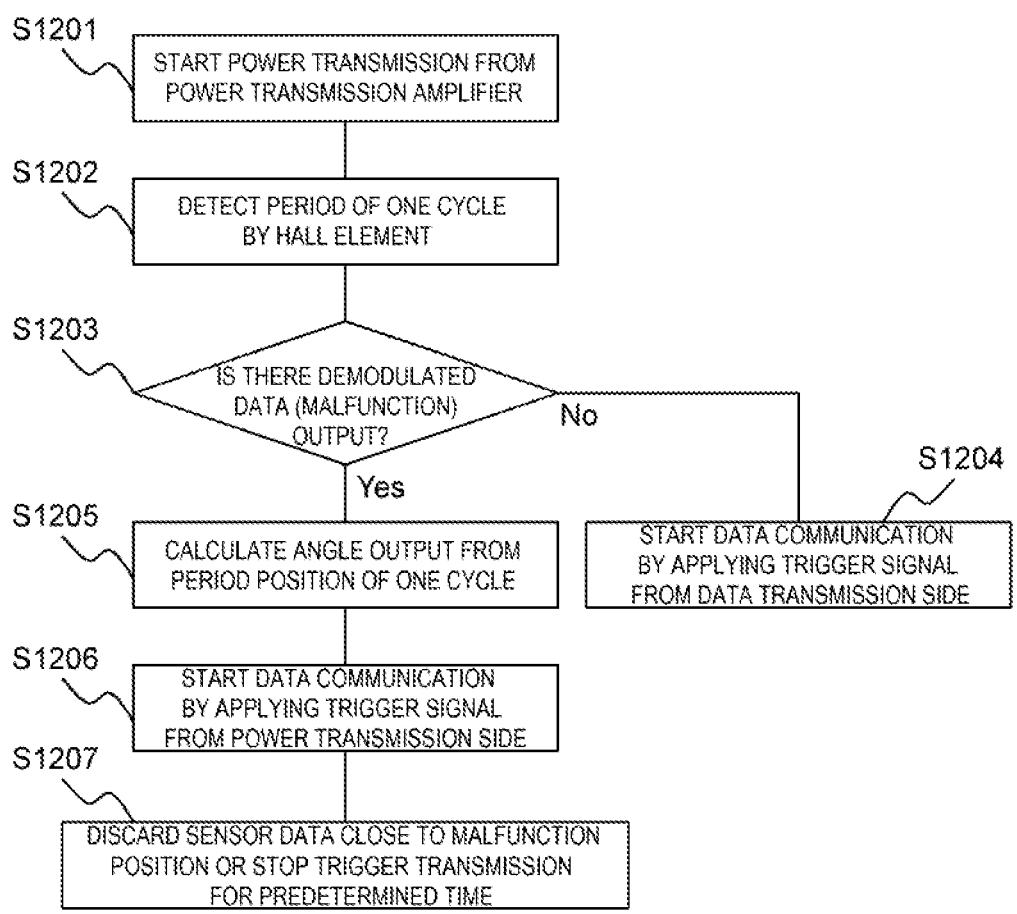

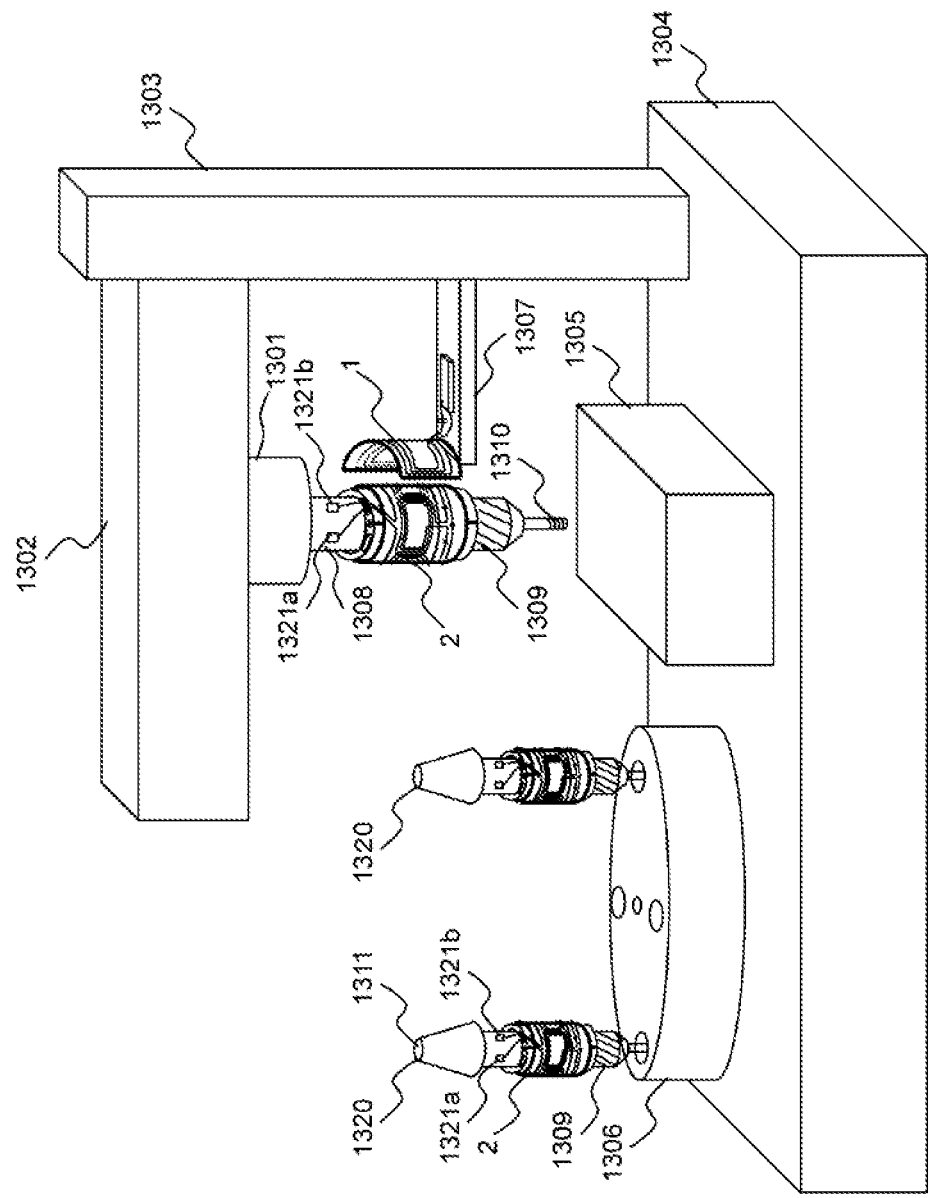
[FIG. 13]

[FIG. 14]
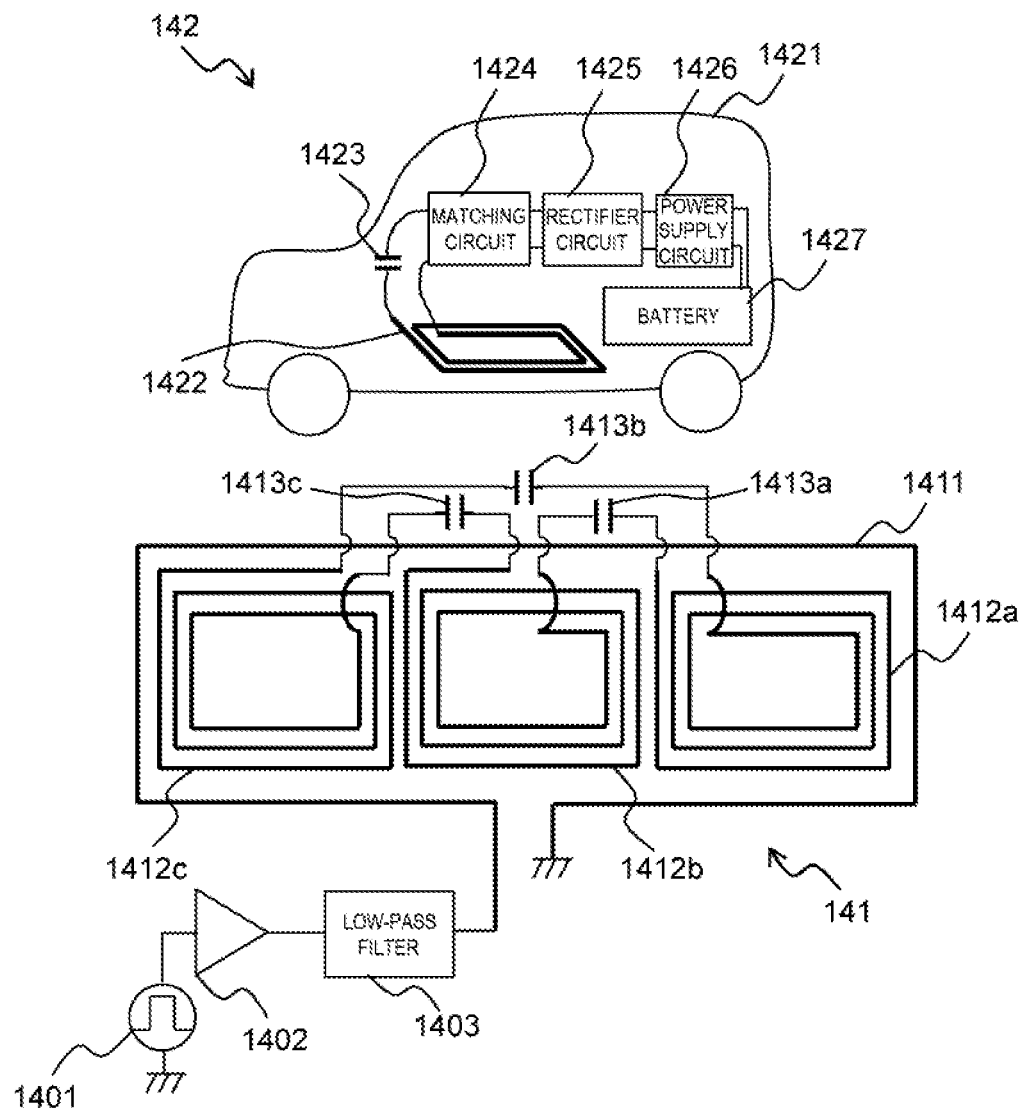

[FIG. 15]
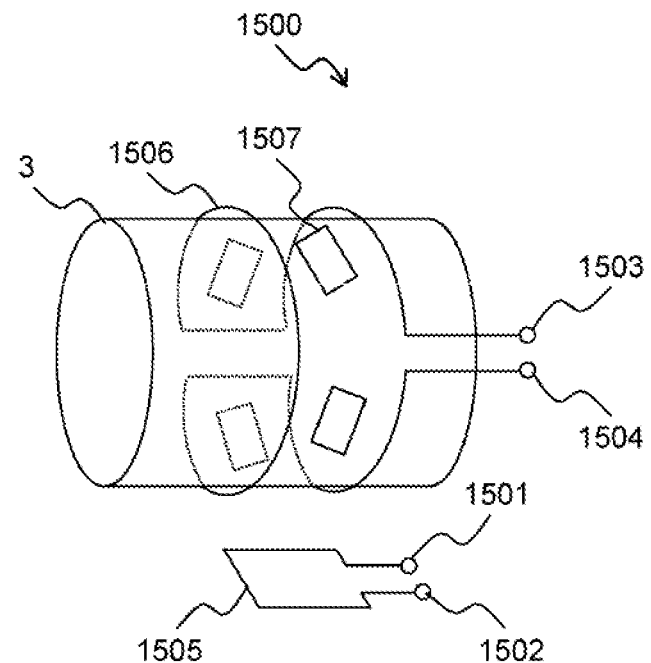
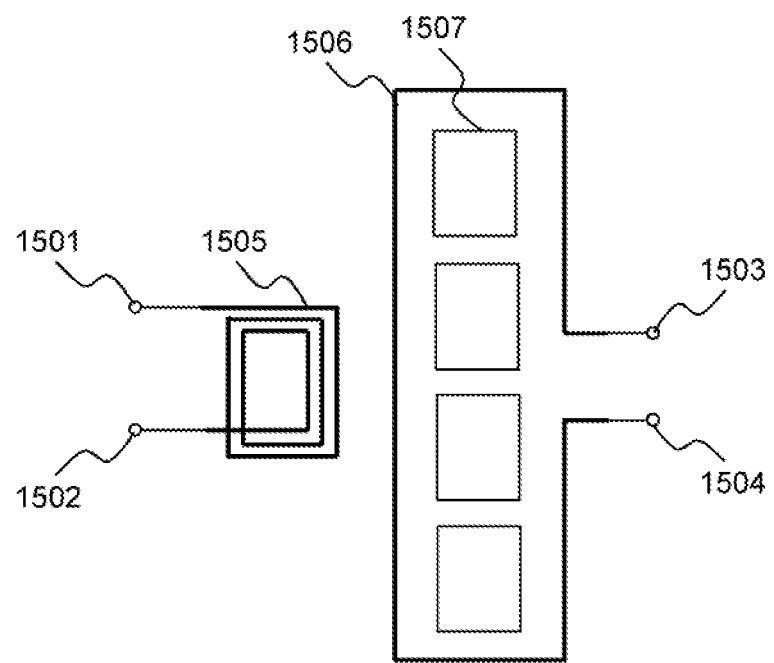

POWER RECEPTION UNIT, POWER TRANSMISSION UNIT, AND WIRELESS POWER TRANSFER DEVICE

CLAIM OF PRIORITY

The present application claims priority from Japanese patent application JP 2019-022720 filed on Feb. 12, 2019, the content of which is hereby incorporated by reference into this application.

TECHNICAL FIELD

The present invention relates to a wireless power transfer device.

BACKGROUND ART

Although a small electronic device such as a portable terminal has been reducing in size and thickness, a connector connection at a time of charging is cumbersome, and charging by wireless power transfer is required.

In wireless power transfer, a method using a radio wave such as a microwave and an electromagnetic induction method using magnetic field coupling have been discussed. The microwave has an excellent transmission distance yet poor transmission efficiency, and does not lead to practical use. On the contrary, the electromagnetic induction method has a transmission distance of about several cm and transmission efficiency of a coil used for power transmission and reception is up to about 90%. Thus, transmission by magnetic field coupling is considered to be a mainstream in wireless charging. However, in the electromagnetic induction method that has a short transmission distance, it is necessary to align positions of a power transmission coil and a power reception coil, and usability thereof is not good.

In a rotating body such as an electric motor, for a purpose of predicting a failure, rotating body sensing is required in which a strain gauge or a sensor such as an acceleration sensor is mounted on a shaft to acquire measurement data. In rotating body sensing, it is necessary to supply power to a rotating sensor and acquire sensor data. A configuration having a mechanical contact point, such as an existing slip ring, requires periodic replacement due to wear of the contact point. Further, wireless power transfer and data transmission is desirable since data to be transmitted may deteriorate due to noise generated from the contact point.

A wireless communication system for a rotating body described in PTL 1 supplies power in a non-contact manner to a movable part such as a rotating body, and the configuration thereof supplies power to a power reception coil wound around the rotating body from a fixed power transmission coil, as shown in FIG. 15.

As shown in the figure, a power reception coil 1506 having an elongated shape is wound in a circumferential direction of a shaft 3, and a plurality of resonators 1507 are disposed in the power reception coil 1506. In addition, a power transmission coil 1505 is disposed close to the power reception coil 1506. High frequency power input to input terminals 1501 and 1502 is transmitted to the power reception coil 1506 in a non-contact manner by magnetic coupling between the power transmission coil 1505 and the power reception coil 1506, and is output from output terminals 1503 and 1504. At this time, the resonators 1507 resonate at a frequency equal to the power transmission frequency, thereby improving transmission efficiency between the power transmission coil 1505 and the power reception coil 1506. With the above configuration, transmitted electric power from the power transmission coil 1505 is wirelessly supplied at high efficiency by arranging the plurality of resonators 1507 in the power reception coil 1506.

PRIOR ART LITERATURE

Patent Literature

PTL 1: JP-A-2013-34140

SUMMARY OF INVENTION

Technical Problem

In the configuration (shown in FIG. 15) of PTL 1 described above, in order to improve transmission efficiency, the plurality of resonators 1507 are arranged in a loop of the power reception coil 1506 and each resonator 1507 is independent. At this time, magnitude and phase of current flowing through each of the resonators 1507 varies depending on a coupling state of the power transmission coil 1505 and the resonators 1507 since each of the resonators 1507 is independent even if resonance frequencies of the resonators 1507 are the same. For example, when the resonators 1507 and the power transmission coil 1505 are opposite to each other and when the power transmission coil 1505 is present at a boundary between two adjacent resonators 1507, the magnitude and phase of the current flowing through each of the resonators 1507 is different. Therefore, a received voltage varies depending on a rotation angle of the shaft 3. In particular, when currents flowing through adjacent resonators 1507 are reversed, magnetic fluxes cancel each other, and thus transmission efficiency is greatly reduced.

When the received voltage varies, a sensor voltage becomes unstable in rotary body sensing, and thus sensor detection accuracy is degraded. In addition, in sensor data transmission using load modulation, amplitude modulation is applied to a received electric power signal to transmit data to a power transmission side. However, erroneous data is transmitted when the received voltage varies.

In addition to the configuration factor of the resonators, a distance between the power transmission coil and the power reception coil varies due to eccentricity of the shaft or manufacturing errors. Accordingly, the transmission efficiency varies with the rotation angle of the shaft, and a malfunction may occur in data transmission due to the load modulation.

Further, there is a demand for an efficient wireless power transfer method that can supply sufficient electric power even when the power transmission coil and the power reception coil are placed at a position deviated from a predetermined position without requiring strict alignment therebetween.

Solution to Problem

A representative example of an invention disclosed in the present application is as follows. That is, the invention provides a power reception unit that receives electric power transmitted from a power transmission unit, in which variation in power transmission efficiency is prevented. The power reception unit includes: a plurality of power reception coils that are configured to receive electric power by magnetic coupling with a power transmission coil of the power transmission unit; and a load coil that is disposed close to the power reception coils, in which a plurality of series resonant circuits that resonate at a frequency equal to a power transmission frequency are constituted by each of the plurality of power reception coils and a resonance capacity, the plurality of series resonant circuits are connected in series in a loop shape, and the load coil extracts received electric power from the series resonant circuits.

Advantageous Effect

According to an aspect of the invention, variation in electric power transmission efficiency can be prevented. Problems, configurations and effects other than those described above will become apparent from the following description of embodiments.

BRIEF DESCRIPTION OF DRAWINGS

FIG. 1 shows a structure of a wireless power transfer device according to a first embodiment.

FIG. 2 shows a circuit configuration of the wireless power transfer device according to the first embodiment.

FIG. 3 shows operation of a coil of the wireless power transfer device according to the first embodiment.

FIG. 4 shows transmission characteristics of the wireless power transfer device according to the first embodiment.

FIG. 5 shows frequency characteristics of transmission efficiency of the wireless power transfer device according to the first embodiment.

FIG. 6 shows a circuit configuration of a wireless power transfer device according to a second embodiment.

FIG. 7 shows a circuit configuration of a wireless power transfer device according to a third embodiment.

FIG. 8 shows a structure of the wireless power transfer device according to the third embodiment.

FIG. 9 shows a circuit configuration of a wireless power transfer device according to a fourth embodiment.

FIG. 10 shows a structure of the wireless power transfer device according to the fourth embodiment.

FIG. 12 is a flowchart of processing executed by the wireless power transfer device according to the fourth embodiment.

FIG. 13 shows a configuration of a wireless power transfer device according to a fifth embodiment.

FIG. 14 shows a configuration of a wireless power transfer device according to a sixth embodiment.

FIG. 15 shows an example of a wireless power transfer device in related arts.

DESCRIPTION OF EMBODIMENTS

Figure 11A:
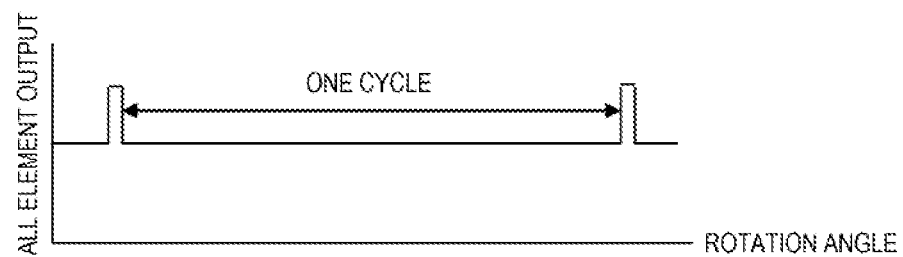
FIGS. 11A to 11D are characteristic diagrams of operation of the wireless power transfer device according to the fourth embodiment.

Embodiments of the invention describe a wireless power transfer device, wireless power transfer to charge a battery of a small electronic device such as a portable terminal in a non-contact manner, wireless power transfer to a sensor mounted on a rotating body, and a wireless power transfer technique capable of communicating sensor data from a sensor during wireless power transfer.

First Embodiment

The first embodiment will be described with reference to the drawings. FIG. 1 shows a structure of a wireless power transfer device according to the first embodiment, and FIG. 2 shows a circuit configuration.

First, an overall configuration of the wireless device according to the first embodiment will be described with reference to FIG. 1. The wireless power transfer device according to the first embodiment is divided into a power transmission unit 1 and a power reception unit 2. The power transmission unit 1 includes a power transmission circuit 4, a power transmission coil base 5, a power transmission coil 101, and a resonance capacitor 102. The power reception unit 2 includes a power reception coil base 6, clamp portions 7a and 7b, a power reception circuit 8, circuit mounting portions 9a and 9b, a support portion 10, power reception coils 111a, 111b, and 111c, a load coil 112, and resonance capacitors 113a, 113b, and 113c.

The power reception unit 2 is fixed to the shaft 3, which is a rotating body, by the clamp portions 7a and 7b that are openable and closable with the support portion 10 as a fulcrum, and can rotate or roll around together with the shaft 3. The power reception coil base 6 is attached to the outer periphery of the clamp portions 7a and 7b by, for example, bonding. Further, the power reception coils 111a, 111b, and 111c are disposed close to each other in a circumferential direction of the shaft 3 on the power reception coil base 6. The power reception coils 111a, 111b, and 111c are arranged symmetrically to an axis of the shaft 3, that is, at equal intervals in a circumferential direction of the clamp portions 7a and 7b. The resonant capacitors 113a, 113b, and 113c are connected in series to each of the power reception coils 111a, 111b, and 111c, and each constitute a series resonant circuit. The series resonant circuits are connected in series in a loop shape. The load coil 112 is disposed on an outer periphery of the power reception coils 111a, 111b, and 111c, and an output of the load coil 112 is connected to the power reception circuit 8. The power reception circuit 8 is configured in the circuit mounting portion 9a spaced in an axial direction of the shaft clamp portions 7a and 7b. Further, by providing a magnetic sheet (not shown) that blocks magnetism between the power reception coil base 6 and the clamp portions 7a and 7b, an inductance value of the power reception coils 111a, 111b, and 111c and an inductance value of the load coil 112 are not reduced by a metal portion of the shaft 3. Further, the power reception coils 111a, 111b, and 111c and the load coil 112 are configured by forming a pattern on an insulating sheet made of a resin material such as polyimide.

In addition, the power transmission unit 1 is disposed close to the power reception coils 111a, 111b, and 111c. The power transmission coil 101 is disposed on the power transmission coil base 5 of the power transmission unit 1, and is connected to the power transmission circuit 4 via the resonance capacitor 102. The power transmission coil base 5 is formed in an arc shape along a circumference of the shaft 3, and the power transmission coil 101 disposed on the power transmission coil base 5 is also formed in an arc shape. Although the power transmission coil 101 is formed on an outer periphery of the power transmission coil base 5 in the figure, the power transmission coil 101 may also be formed on an inner peripheral side of the power transmission coil base 5, and a conductive pattern formed on an insulating sheet such as polyimide may also be attached. The power transmission coil 101 is disposed outside the power reception coils 111a, 111b, and 111c in the circumferential direction of the shaft 3. The power transmission coil 101 may have a magnitude in which its length in the circumferential direction of the shaft 3 is equal to or less than a half cycle.

As shown in FIG. 2, in the wireless power transfer device according to the first embodiment, the power transmission circuit 4 includes a signal source 201, a class E amplifier 202, a low-pass filter 210, a sensor data output terminal 203, a receiver 204, and an antenna 205, and the power reception circuit 8 includes a matching circuit 220, a rectifier circuit 230, a power supply circuit 241, a transmitter 242, an AD converter 243, a sensor 244, and an antenna 245. In the present embodiment, a class E power transmission amplifier is used from a viewpoint of improving amplification efficiency. However, other types of power transmission amplifiers may also be used.

The low-pass filter 210 is a π-type filter including electrostatic capacitors 211 and 213 and an inductor 212. The matching circuit 220 is an L type matching circuit of an equilibrium type that includes an electrostatic capacitor 221 and inductors 222 and 223, and also functions as a low-pass filter. The rectifier circuit 230 includes a full-wave rectifier circuit having rectifier diodes 231, 232, 233, and 234, and a smooth capacitor 235. A power supply output from the power supply circuit 241 is supplied to the transmitter 242, the AD converter 243, and the sensor 244. The sensor 244 measures a peripheral physical quantity (for example, strain amount, acceleration, and temperature).

Operation of the wireless power transfer device according to the first embodiment will be described with reference to FIG. 2. A power transmission signal of a transmission frequency from the signal source 201 is amplified by the class E amplifier 202 and input to the low-pass filter 210. The transmission signal is a high-frequency signal that changes at a resonance frequency of a series resonant circuit formed by the power transmission coil 101 and the resonance capacitor 102, and a resonance frequency of a series resonant circuit formed by the power reception coils 111a, 111b, and 111c and the resonance capacitors 113a, 113b, and 113c. The low-pass filter 210 reduces harmonic component generated by the class E amplifier in the input power transmission signal, and applies a fundamental wave to the series resonance circuit formed by the power transmission coil 101 and the resonance capacitor 102. A large resonance current flows through the power transmission coil 101 and a strong magnetic field is generated since the resonance frequency of the power transmission coil 101 and the resonance capacitor 102 is equal to the power transmission frequency. In addition, a strong magnetic field (a magnetic flux) generated by the power transmission coil 101 induces a resonance current in the power reception coils 111a, 111b, and 111c since the power reception coils 111a, 111b, and 111c installed close to the power transmission coil 101 form a series resonance circuit with the resonance capacitors 113a, 113b, and 113c respectively. In addition, resonance currents having the same magnitude flow through each of the power reception coils 111a, 111b, and 111c since each series resonant circuit is connected in a loop shape. Power received by the power reception coils 111a, 111b, and 111c is extracted by the resonance currents flowing through the power reception coils 111a, 111b, and 111c since the power reception coils 111a, 111b, and 111c are magnetically coupled to the surrounding load coils 112. After matching the impedance in the matching circuit 220, the received electric power is converted into a DC voltage by the rectifying circuit 230, a constant voltage is output by the power supply circuit 241, and is supplied to the sensor 244 as a power source. In addition, the sensor output of the sensor 244 is AD-converted by the AD converter 243, and is transmitted as a wireless signal by the transmitter 242 and the antenna 245. The transmitted signal is received and demodulated by the antenna 205 and the receiver 204, and is output as sensor data from the output terminal 203.

With the above configuration, wireless power is supplied to the sensor 244 installed in the rotating body, and a wireless machine (the transmitter 242 and the receiver 204) transmits sensor data, thereby enabling power supplying and data transmission in a non-contact manner. However, although the power supply circuit 241 absorbs a variation of an input voltage to a certain degree and outputs a constant voltage, responsiveness of the power supply circuit 241 cannot follow when transmission efficiency varies due to a rotation angle and variation of the received voltage increases. Therefore, a ripple is generated in the power supply voltage supplied to the sensor 244, the output voltage from the sensor 244 varies, and detection accuracy of the sensor 244 decreases. Therefore, currents flowing in the adjacent power reception coils 111a, 111b, and 111c are in reverse phase due to magnetic coupling with the power transmitting coil 101, since currents flowing through the power reception coils 111a, 111b, and 111c are equal, the power reception coils 111a, 111b, and 111c are arranged symmetrically to the axis of the shaft 3, and the adjacent power reception coils 111a, 111b, and 111c are arranged close to each other. Therefore, it is possible to prevent a decrease in power reception efficiency due to a fact that the magnetic field is canceled by the adjacent power reception coils 111a, 111b, and 111c. In addition, variation in transmission efficiency due to the rotation angle can be prevented since strength of coupling between the power transmission coil 101 and the power reception coils 111a, 111b, and 111c can be substantially constant regardless of the rotation angle. Thus, deterioration of sensor detection accuracy can be prevented.

Three power reception coils 111a, 111b, and 111c are provided in the figure. However, the invention is not limited thereto. In addition, although the load coil 112 is formed of one turn, the load coil 112 may be two or more turns if the impedance is matched by the matching circuit 220 at a downstream.

Next, an operation principle why variation in transmission efficiency due to a rotation angle is reduced will be described with reference to FIG. 3. FIG. 3 shows the resonance capacitor 102, the power transmission coil 101, the power reception coils 111a, 111b, and 111c, the resonance capacitors 113a, 113b, and 113c, and the load coil 112 in FIG. 2, and other configurations are omitted. In the figure, the plurality of power reception coils 111a, 111b, and 111c are connected in series to form a loop so that currents flowing through the power reception coils 111a, 111b, and 111c are in the same phase, and the adjacent power reception coils 111a, 111b, and 111c are arranged to approach each other in the circumferential direction and are further symmetrical to the axis of the shaft 3. Therefore, currents flowing through adjacent wirings of the power reception coils 111a, 111b, and 111c are opposite to each other at the same magnitude. Further, when the power reception coils 111a, 111b, and 111c are wound around the shaft 3, both ends of the power reception coils 111a, 111b, and 111c approach each other, so that the magnetic flux due to the current flowing in the axial direction of the shaft 3 is canceled. Further, since currents flowing through wires of the resonance capacitors 113a, 113b, and 113c are opposite to each other at the same magnitude, the magnetic flux generated by the wires of the resonance capacitors 113a, 113b, and 113c is also canceled. Therefore, the density of the magnetic flux generated by the power reception coils 111a, 111b, and 111c is of constant magnitude in the circumferential direction, and variations in transmission efficiency due to rotation can be prevented.

FIGS. 4 and 5 show experimental results of transmission characteristics of transmission and reception coils according to the first embodiment and transmission and reception coils in the related art shown in FIG. 15. In the experiment, a shaft having diameter of 82 mm was used, three six-turn power reception coils having a magnitude of 27 mm×90 mm were disposed around the shaft, the one-turn load coil 112 was disposed around the power reception coils at a position of 5 mm away therefrom, and power was supplied by a transmitting coil at a position of 10 mm away from the power reception coils. In addition, in the transmission and reception coils in the related art shown in FIG. 15, an independent resonance circuit was formed for each receiving coil having the same shape as those described above.

FIG. 4 is a diagram showing experimental results of transmission characteristics between the transmission and reception coils according to the first embodiment and the transmission characteristics between the transmission and reception coils in the related art shown in FIG. 15. A horizontal axis in the figure is the rotation angle, and a vertical axis is the transmission efficiency between the coils. As shown in the figure, it can be seen that transmission efficiency varies by about 10% by the rotation angle in the related art while the transmission efficiency of the transmission and reception coils according to the first embodiment is substantially constant regardless of the rotation angle.

In FIG. 5, a horizontal axis in the figure is frequency, and a vertical axis is transmission characteristics between the coils. As shown in the figure, in the transmission and reception coils in the related art, there is frequency with significantly reduced transmission efficiency, but in the transmission and reception coils according to the first embodiment, no significant decrease in transmission efficiency is observed in a passband. It is considered that this is because magnetic fluxes cancel each other when phases of adjacent coils are opposite to each other.

As described above, in the first embodiment, since the magnetic flux interlinking with the power reception coils is constant, variation in the transmission efficiency due to the rotation angle can be prevented.

Second Embodiment

The second embodiment is different from the first embodiment in a fact that a load modulation system is used, which performs communication by using a change in a reflected wave of transmitted electric power due to a change in the impedance of a coil on power reception side according to a change in data detected by a sensor. In the second embodiment, differences from the above-described embodiment are mainly described, and the same components as those in the first embodiment are denoted by same reference numerals, and descriptions thereof are omitted.

FIG. 6 is a diagram illustrating a circuit configuration of a wireless power transfer device according to the second embodiment.

In the wireless power transfer device according to the second embodiment, the power transmission circuit 4 includes the signal source 201, the class E amplifier 202, the low-pass filter 210, the sensor data output terminal 203, the receiver 204, the antenna 205, a common mode filter 600, a data signal request terminal 602, a resistor 603, and switching elements (electric field effect transistors) 604a, 604b, a demodulation output terminal 605, a demodulation circuit 606, resistors 607a and 607b, and a resistor 608, and the power reception circuit 8 includes the matching circuit 220, the rectifier circuit 230, the power supply circuit 241, the transmitter 242, the AD converter 243, the sensor 244, the antenna 245, a common mode filter 610, field effect transistors 622A, 622B, an electrostatic capacitor 621, a wave detection circuit 623, and a timer circuit 624. The common mode filter 600 includes coil transformers 601a and 601b that are strongly coupled to each other by a toroidal core and the like, and similarly the common mode filter 610 also includes coil transformers 611a and 611b that are strongly coupled to each other by a toroidal core and the like.

When the switching elements 604a and 604b are in an ON state by a request signal input from the data signal request terminal 602, the resistor 603 is grounded via the resistor 608, and accordingly the power transmission signal level of the low-pass filter 210 decreases and the received voltage of the load coil 112 on power reception side decreases. The wave detection circuit 623 on the power reception side detects a decrease in the received voltage and sets a state of the timer circuit 624 to ON. When the timer circuit is in the ON state for predetermined time, the AD converter 243 is brought into an enabled state, and the sensor value output by the sensor 244 for the predetermined time, in which the timer circuit is in the ON state, is AD-converted by the AD converter 243. Further, the field effect transistors 622a and 622b are turned ON and OFF by sensor data converted into digital values. As a result, since the impedance of the load coil 112 changes via the electrostatic capacitor 621, the reflected wave of the transmitted electric power changes. The demodulation circuit 606 on the power transmission side detects and demodulates the change, and outputs sensor data from the demodulation output terminal 605.

In the above configuration, by connecting series resonant circuits including the power reception coils 111a, 111b, and 111c in series, the variation of the received voltage (transmission efficiency) due to the rotation angle is reduced, and accordingly sensor data communication by load modulation is possible.

If the value of the resistor 603 connected to a drain of the switching element 604a is small, the change in the transmitted electric power to be a trigger increases, but the power transmission efficiency decreases. Similarly, if the value of the electrostatic capacitor 621 connected to a drain of the field effect transistor 622a is large, modulation degree of the load modulation increases but the power reception efficiency decreases. Therefore, it is necessary to appropriately set the value of the resistor 603 and the value of the electrostatic capacitor 621. In addition, the predetermined time during which the timer circuit 624 is turned ON is slightly longer than one conversion cycle time of the AD converter 243. This is for a purpose that the AD converter 243 would not be brought into a disabled state by operating the wave detection circuit 623 according to a change in the signal level due to ON and OFF of the field effect transistor 622 with the AD-converted data value (to disable the output of the detection circuit 623 during communication of the AD-converted data).

Further, by providing the common mode filters 600 and 610 on the power transmission side and the power reception side, coupling due to a parasitic capacitance component generated between the power transmission coil 101, the power reception coils 111a, 111b, and 111c and the load coil 112 is prevented, the decrease in transmission efficiency is prevented, and superposition of common mode ripple on the received voltage is prevented.

Third Embodiment

The third embodiment is different from the first embodiment in a fact that shapes of power reception coils 701a and 701c at both end parts among power reception coils 701a, 701b, and 701c wound around the clamp portions 7a and 7b are deformed. In the third embodiment, differences from the above-described embodiment are mainly described, and the same components as those in the first embodiment are denoted by same reference numerals and descriptions thereof are omitted.

FIG. 7 shows a circuit configuration of a wireless power transfer device according to the third embodiment, and FIG. 8 shows a structure thereof.

In the wireless power transfer device according to the third embodiment, the power transmission circuit 4 includes the signal source 201, the class E amplifier 202, the low-pass filter 210, the sensor data output terminal 203, the receiver 204, and the antenna 205, and the power reception circuit 8 includes the matching circuit 220, the rectifier circuit 230, the power supply circuit 241, the transmitter 242, the AD converter 243, the sensor 244, and the antenna 245.

The configuration shown in FIGS. 7 and 8 differs from the first embodiment in shapes of the power reception coils 701a and 701c at both end parts of the power reception coil wound around the clamp portions 7a and 7b. When an inductance value of each power reception coil is Lr1, Lr2, Lr3, and an area of each coil is S1, S2, and S3, the power reception coils 701a and 701c satisfy a condition (Equation 1) in which ratios of the inductance value and the area in the coils are equal.

$$Lr1/S1 = Lr2/S2 = Lr3/S3 \quad (1)$$

Magnetic flux densities of the coils are equal when Equation 2 is satisfied since currents flowing through the coils are the same. Thus, the magnetic flux densities generated in the coils can be equalized by allowing the ratios of the inductance value and the area to be equal. That is, if the condition is satisfied, the transmission efficiency variation due to the rotation angle can be prevented even when a coil shape is different.

$$(Lr1/S1)I = (Lr2/S2)I = (Lr3/S3)I \quad (2)$$

FIG. 8 shows a configuration example of the wireless power transfer device according to the third embodiment. Differences from the configuration of the first embodiment will be described. In the figure, although the power reception side has a structure in which the shaft 3 is fixed by the clamp portions 7a and 7b, a gap g may occur at a position where the clamp portions 7a and 7b are close to each other depending on a diameter of the shaft 3. At this time, the transmission efficiency decreases when the gap g passes through the vicinity of the power transmission coil 101 since the distance between the power reception coils 701a and 701c is larger than that between other power reception coils by the gap g and the magnetic flux density decreases. Therefore, a decrease in magnetic flux density is prevented when the gap g passes through by widening the width in the vicinity of end parts of the power reception coils 701a and 701c at the end parts. At this time, a coil can be easily designed even when the coil is deformed since the ratios of the inductance value and the area of the coils are equal.

Fourth Embodiment

The fourth embodiment is different from the second embodiment in a fact that a rotation period is detected by a magnet 904 and a Hall element 903, and that data transmitted corresponding to a change in transmission efficiency is discarded. In the fourth embodiment, differences from the above-described embodiment are mainly described, the same components as those in the second embodiment are denoted by same reference numerals, and descriptions thereof are omitted.

FIG. 9 shows a circuit configuration of a wireless power transfer device according to the fourth embodiment, and FIG. 10 shows a configuration thereof.

In the wireless power transfer device according to the fourth embodiment, the power transmission circuit 4 includes the signal source 201, the class E amplifier 202, the low-pass filter 210, the sensor data output terminal 203, the receiver 204, the antenna 205, the common mode filter 600, the data signal request terminal 602, the resistor 603, the switching elements (electric field effect transistors) 604A, 604B, the demodulation output terminal 605, the demodulation circuit 606, and a control circuit 902, and the power reception circuit 8 includes the matching circuit 220, the rectifier circuit 230, the power supply circuit 241, the transmitter 242, the AD converter 243, the sensor 244, the antenna 245, the common mode filter 610, the field effect transistors 622A, 622B, the electrostatic capacitor 621, the wave detection circuit 623, and the timer circuit 624.

An output of the Hall element 903 is input to the control circuit 902 of the power transmission circuit 4. The Hall element 903 detects the magnet 904 installed on the power reception rotation side, and is installed close to power transmission coils. The control circuit 902 can detect the rotation period since a signal is output from the Hall element 903 when the magnet 904 passes through the vicinity of the Hall element 903 as the shaft 3 rotates. In addition, the demodulation output terminal 605 that inputs and outputs a data signal request signal and sensor data is connected to the control circuit 902.

As shown in the figure, in a rotating body wireless power transfer device, a distance between the fixed side power transmission coil 101 and the rotation side power reception coils 111a, 111b, and 111c varies and transmission efficiency changes depending on the rotation angle due to eccentricity of the shaft 3, the variation of diameters of the clamp portions 7a and 7b, and the eccentricity of the clamp portions 7a and 7b to the shaft 3. For this reason, when data is transmitted by load modulation, the variation of voltage transmitted between coils is superimposed on the load modulation, and erroneous data is transmitted. In the fourth embodiment, in order to avoid a malfunction of load modulation due to such a change in the distance between coils, data transmission is started after checking whether a malfunction occurs before data transmission by load modulation is started (for example, when power is turned on). As shown in the figure, the control circuit 902 does not input a data request signal to the data signal request terminal 602 when the power is turned on, and rotates the shaft 3 by one or more cycles while performing only wireless power supply. At this time, when data from the demodulation circuit 606 is output, since a malfunction occurs in the load modulation, the rotation angle at which the data is output is obtained relatively from a cycle detection value of the Hall element 903 and stored in a memory of the control circuit 902. The control circuit 902 then outputs a data request signal and provides a transmission trigger for the sensor data. Then, data near the rotation angle of the malfunction occurrence stored in the memory is discarded, and the sensor data is output from the sensor data output terminal 901.

FIG. 10 shows an example of an arrangement of the Hall element 903 that detects the rotation period. The Hall element 903 is mounted on the power transmission coil base 5, and the magnet 904 is mounted at a position of the power reception coil base 6 that is detectable by the Hall element 903. Further, the control circuit 902 is mounted on the power transmission circuit 4. Accordingly, the rotation period can be detected.

FIG. 11 is a characteristic diagram of operation according to the fourth embodiment in which a horizontal axis is represented by a rotation angle. FIG. 11(a) shows an example in which the Hall element 903 detects the magnet 904 by the rotation angle. The Hall element 903 detects the magnet 904 for each cycle and outputs a detection voltage. Although the magnet 904 is detected for each cycle in the figure, it is possible to detect the magnet 904 every half cycle by installing the magnet 904 every 180 degrees.

Figure 11B:
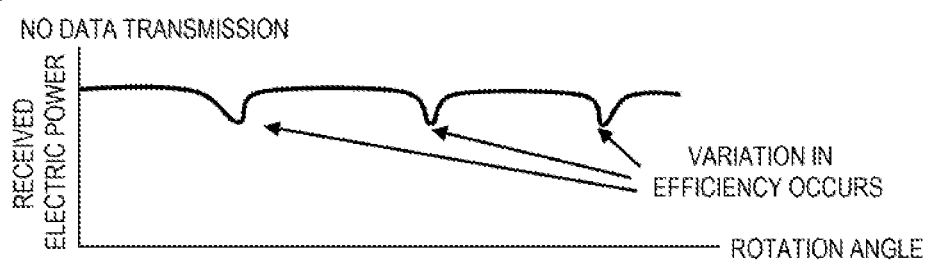
Figure 11C:
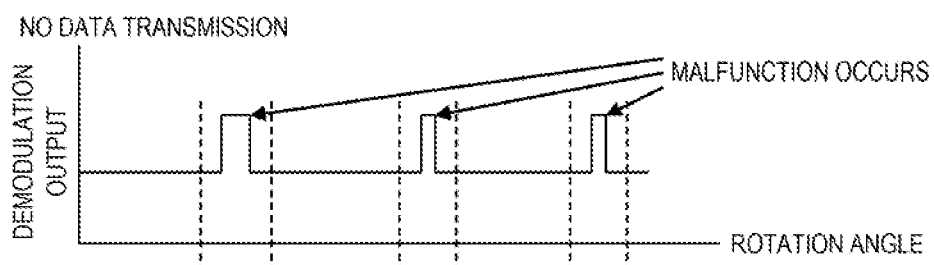
Figure 11D:
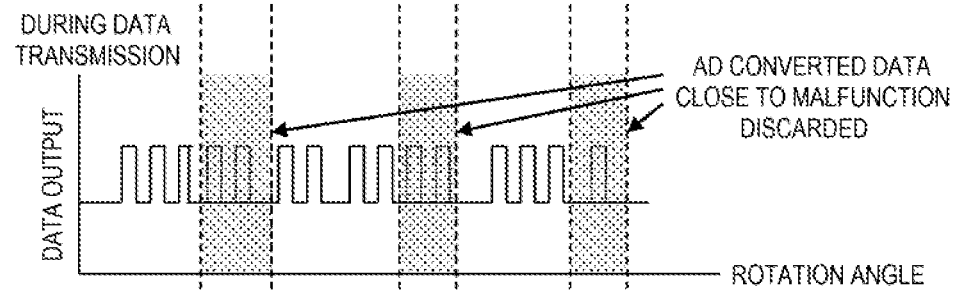

FIG. 11(b) shows an example of received electric power when data transmission is not performed. In the illustrated example, transmission efficiency varies at three positions in one cycle. Therefore, as shown in FIG. 11(c), the demodulation output changes due to the variation in the transmission efficiency at the three positions, and a malfunction occurs. Therefore, as shown in FIG. 11(d), the control circuit 902 discards data of a position (the rotation angle) where the malfunction occurs and outputs sensor data from the sensor data output terminal 901.

FIG. 12 is a flowchart of processing executed by the control circuit 902 according to the fourth embodiment. When the power is turned on, power transmission from the class E amplifier 202 is started (S1201). Then, in order to grasp the time of one cycle by the Hall element 903, the shaft 3 is rotated one cycle or more without transmitting a data request signal (S1202).

At this time, since no malfunction is determined if no demodulated data is detected (No in S1203), the data signal request signal is output to start normal data transmission (S1204). On the other hand, timing at which the malfunction occurs (for example, the rotation angle in one cycle) is grasped (S1205) since it is considered that a malfunction of the load modulation has occurred when the demodulated data is detected (Yes in S1203). Then, data transmission is started by outputting the data request signal from the power transmission side (S1206), and sensor data close to the angle at which the malfunction is detected is discarded (S1207). Instead of discarding the sensor data, the transmission of the data request signal may be stopped for predetermined time close to the angle at which the malfunction is detected.

In the fourth embodiment, a malfunction is determined before the sensor data is transmitted (for example, when the power is turned on) by detecting a demodulated output in a state in which no data signal is transmitted. However, it is also possible to determine a malfunction or timing at which the malfunction occurs by transmitting a signal of a predetermined pattern (for example, a periodic signal repeating 01) for one or more cycles from the power reception side and confirming the data output of the predetermined pattern.

According to the fourth embodiment, by the above configuration, it is possible to avoid malfunction of load modulation due to variation in the distance between the power transmission coil and the power reception coil and variation in efficiency due to the rotation angle caused by asymmetry between adjacent power reception coils.

Fifth Embodiment

Next, the fifth embodiment will describe an example in which a wireless power transfer device is mounted on a machine such as a milling machine. In the fifth embodiment, differences from the above-described embodiments are mainly described, the same components as those in the above embodiments are denoted by the same reference numerals, and descriptions thereof are omitted.

FIG. 13 shows a configuration of a wireless power transfer device according to the fifth embodiment. In the machine according to the fifth embodiment, a main shaft head 1302 is supported by a base 1304 and a column 1303, and an electric motor (not shown) is provided in the main shaft head 1302 to rotate a main shaft 1301. A tool holder 1320 is attached to the main shaft 1301, and a tool 1310 is attached to a front end of the tool holder 1320 by a chuck 1309. When the electric motor rotates, the tool 1310 rotates to process an object to be processed fixed on a movable table 1305. Further, the tool holder 1320 includes a taper portion 1311, a shaft 1308, the power reception unit 2, the chuck 1309, and the tool 1310. Strain gauges 1321a and 1321b are attached to the shaft 1308, the taper portion 1311 is fitted to the main shaft 1301 so that the tool holder 1320 is attached to the main shaft 1301. Further, since the tool needs to be replaced depending on type of machining, a plurality of tool holders 1320 to which different tools are mounted are placed on a turntable 1306, and the tool can be replaced by rotating the turntable 1306 and further moving the turntable 1306 in the direction of the main shaft 1301.

In addition, the power transmission unit 1 is fixed close to the power reception unit 2 of the tool holder 1320 mounted on the main shaft 1301 by an arm 1307, and performs wireless power transfer from the power transmission unit 1 to the power reception unit 2. Further, the power is supplied to the strain gauges 1321a and 1321b, and the strain gauges 1321a and 1321b are used to measure the amount of strain, thereby acquiring stress data during processing of the shaft 1308. The transmission and reception coil used at this time may be anyone in the above-described first to fourth embodiments (FIGS. 2, 6, 7, and 9).

In the illustrated example, two strain gauges 1321a and 1321b are attached and strain is measured at two positions, but strain measurement positions are not limited to this and may be three or more. In addition, the sensor may be another type of sensor such as an acceleration sensor.

Sixth Embodiment

Next, an example of charging an electric vehicle in a non-contact manner will be described as the sixth embodiment. In the sixth embodiment, differences from the above-described embodiments will be mainly described.

FIG. 14 shows a configuration of a wireless power transfer device according to the sixth embodiment. In the sixth embodiment, a battery 1427 of an electric vehicle 1421 is charged in a non-contact manner, and, for example, when power supplying coils 1412a, 1412b, and 1412c are arranged in a wide range, power can be supplied while traveling. As shown in the figure, in the sixth embodiment, the configuration of the power transmission coil and the power reception coil is opposite to the above-described embodiments, and in a power transmission unit 141, series resonance by power transmission coils 1412a, 1412b, and 1412c and resonance capacitors 1413a, 1413b, and 1413c are connected in series to form a loop shape. A power supplying coil 1411 that supplies transmitted electric power to the power transmission coils 1412a, 1412b, and 1412c is disposed on an outer periphery thereof. Power supply from a switching amplifier 1402 that is switched by a signal from a signal source 1401 is applied to the power supplying coil 1411 via a low-pass filter 1403. In a power reception unit 142, a series resonance circuit of a power reception coil 1422 and a resonance capacitor 1423 receives the transmission power from the power transmission coils 1412*a*, 1412*b*, and 1412*c*, and after a matching circuit 1424 matches an impedance, a rectifier circuit 1425 rectifies the power and charges the battery 1427 via a power supply circuit 1426.

In the sixth embodiment, since currents flowing through the power transmission coils 1412*a*, 1412*b*, and 1412*c* are the same, magnetic flux densities of magnetic fields generated from the coils are equal. Therefore, even when the electric vehicle 1421 is traveling, if the power transmission coils 1412*a*, 1412*b*, and 1412*c* are installed, power having little variation in transmission efficiency can be received. In the sixth embodiment, phases of the currents flowing in the power transmission coils are reversed, magnetic fields are canceled and a position where transmitted electric power is lowered is no longer generated, and stable power reception can be performed regardless of the coil position, and the electric vehicle 1421 can be continuously charged even if the electric vehicle 1421 is stopped due to congestion and the like.

Although non-contact charging of the electric vehicle is exemplified in the sixth embodiment, the wireless power transfer device of the invention can also be applied to non-contact power supplying of a small-sized electronic device (for example, a mobile phone, a smartphone, and a tablet terminal). By applying the wireless power transfer device of the invention to a small-sized electronic device, it is possible to widen a position where the electronic device is placed for charge, and to supply sufficient power even when the electronic device is placed at a position deviated from a predetermined position.

As described above, the power reception unit 2 according to an embodiment of the invention includes a plurality of power reception coils 111*a* to 111*c* that receive electric power by magnetic coupling with a power transmission coil of the power transmission unit 1, and the load coil 112 that is disposed close to the power reception coils 111*a* to 111*c*. A plurality of series resonant circuits that resonate at a frequency equal to a power transmission frequency are constituted by the plurality of power reception coils 111*a* to 111*c* and the resonance capacity 113*a* to 113*c*. The plurality of series resonant circuits are connected in series in a loop shape, and the load coil 112 extracts received electric power from the series resonant circuits. Thus, magnitudes and phases of currents flowing through the power reception coils 111*a* to 111*c* are the same, and variations in the transmission efficiency in wireless power transfer can be prevented.

In addition, the plurality of power reception coils 111*a* to 111*c* are disposed in a circumferential direction of the shaft 3 and are symmetrical to an axis of the shaft 3, and thus variations in the transmission efficiency due to the rotation of the shaft 3 can be prevented.

In addition, the adjacent power reception coils (111*a* and 111*b*, 111*b* and 111*c*) are disposed close to each other so that directions of currents flowing through adjacent wires of the two power reception coils are opposite to each other, and thus the magnetic fields caused by the currents flowing through the adjacent conducting wires cancel each other, and variations in transmission efficiency in wireless power transfer can be prevented.

In addition, ratios of an inductance value to an area of a coil for the plurality of power reception coils 111*a* to 111*c* are equal, and thus it is possible to prevent a decrease in magnetic flux density when a gap between the power reception coils passes through a wide place. At this time, the coil can be easily designed even when the coil is deformed since the ratios of inductance value and area of a coil are equal in the coils.

In addition, the power transmission unit 141 according to an embodiment of the invention includes a plurality of power transmission coils 1412*a* to 1412*c* that transmit electric power by magnetic coupling with the power reception coil 1422 of the power reception unit 142, and the power supplying coil 1411 that is disposed close to the power transmission coils 1412*a* to 1412*c*. A plurality of series resonant circuits that resonate at a frequency equal to a power transmission frequency are constituted by the plurality of power transmission coils 1412*a* to 1412*c* and the resonance capacity 1413*a* to 1413*c*. The plurality of series resonant circuits are connected in series in a loop shape, and the power supplying coil 1411 supplies transmitted electric power to the series resonance circuits. Thus, magnitudes and phases of currents flowing through the power transmission coils 1412*a* to 1412*c* are the same, and variation in transmission efficiency in wireless power supply can be prevented. Particularly, sufficient electric power can be supplied even when the power reception coil 1422 is placed at a position deviated from a predetermined position since power can be transmitted to the receiving coil 1422 over a wide range on the power transmission side.

In addition, the adjacent power transmission coils (1412*a* and 1412*b*, 1412*b* and 1412*c*) are arranged close to each other such that directions of currents flowing through adjacent wires of the two power transmission coils are opposite to each other, and thus the magnetic fields caused by currents flowing through the adjacent conductive wires cancel each other, and variations in the transmission efficiency in wireless power transfer can be prevented.

In addition, the wireless power transfer device according to an embodiment of the invention includes the power reception unit 2, and the power transmission unit 1 having the power transmission coil 101 that supplies power to the power reception unit 2. The power transmission unit 1 includes the power transmission coil 101 that constitutes series resonant circuits with the resonance capacity 102, an amplifier (the class E amplifier 202) that amplifies a power transmission signal having a predetermined frequency, and the low-pass filter 210 that removes a high frequency component at a downstream of the class E amplifier 202, and generates transmitted electric power to be transmitted having a frequency equal to a resonant frequency of the series resonant circuit by the class E amplifier 202 and the low-pass filter 210. The power reception unit 2 includes the rectifier circuit 230 connected to the load coil 112 via the matching circuit 220, and the power supply circuit 241 that converts an output of the rectifier circuit 230. Thus, a stable power supply can be supplied by wireless power transfer.

In addition, the power transmission coil 101 is formed in an arc shape in a circumferential direction of the shaft, and a circumferential length outside of the power reception coils 111*a*, 111*b* and 111*c* is equal to or less than a half cycle in the circumferential direction of the shaft, and thus power can be easily supplied with a simple structure.

In addition, the power reception unit 2 includes the sensor 244 to which power is supplied from the power supply circuit 241, and the transmitter 242 that transmits sensor data output from the sensor 244. The power transmission unit 1 includes a receiver that receives sensor data transmitted from the power reception unit. Thus, the measurement accuracy of the sensor can be improved. Further, it is possible to efficiently transmit power while preventing variation in power transmission efficiency due to transmission of sensor data.

In addition, the power reception unit 2 includes the sensor 244 to which power is supplied from the power supply circuit 241, and a load modulation circuit (the transistors 622a, 622b) that generates a signal that transmits sensor data output from the sensor 244. The power transmission unit 1 includes the demodulation circuit 606 that demodulates a signal generated by the load modulation circuit. Thus, the measurement accuracy of the sensor can be improved. In addition, sensor data can also be transmitted by load modulation along with power transmission. Therefore, a wireless transceiver is unnecessary and the cost for data transmission can be reduced.

In addition, the magnet 904 is attached to the shaft 7. The power transmission unit 1 includes a magnetic detection unit (the Hall element 903) that detects rotation periods of the power reception coils 111a to 111c according to a change in magnetism, and the control circuit 902 that calculates a timing at which a malfunction occurs in load modulation. The control circuit 902 outputs sensor data in which sensor data of a predetermined period before and after a timing at which a malfunction occurs in load modulation is excluded. Thus, it is possible to avoid a malfunction of load modulation due to variation in distance between the power transmission coil 101 and the power reception coils 111a to 111c or an efficiency variation due to a rotation angle due to asymmetry between the adjacent power reception coils 111a to 111c.

In addition, the load modulation circuit generates a signal of a predetermined pattern for malfunction detection, and the control circuit 902 calculates a timing at which a malfunction occurs by the signal generated by the load modulation circuit. Thus, malfunction of the load modulation caused by the rotation angle can be detected with high accuracy.

In addition, a wireless power transfer device according to an embodiment of the invention includes the power transmission unit 141, and the power reception unit 142 that has a power reception coil 1422 that receives electric power transmitted from the power transmission unit 141. The power transmission unit 141 includes the power transmission coils 1412a to 1412c that constitute series resonant circuits with resonance capacity 1413a to 1413c, the amplifier 1402 that amplifies a power transmission signal having a predetermined frequency, and the low-pass filter 1403 that removes a high frequency component at a downstream of the amplifier 1402, and generates electric power to be transmitted having a frequency equal to a resonant frequency of the series resonant circuits by the amplifier 1402 and the low-pass filter 1403. The power reception unit 142 includes the rectifier circuit 1425 connected to the power reception coil 1422 via the matching circuit 1424, and the power supply circuit 1426 that converts an output of the rectifier circuit 1425. Thus, a stable power supply can be supplied by wireless power transfer.

It should be noted that the invention is not limited to the above-described embodiments and includes various modifications and equivalent configurations within the spirit of the claims. For example, the above-described embodiments have been described in detail in order to make the invention easy to understand, but the invention is not necessarily limited to those having all the configurations described. In addition, a part of a configuration of a certain embodiment may be replaced with a configuration of another embodiment. In addition, a configuration of another embodiment may be added to a configuration of a certain embodiment. In addition, another configuration may be added to, subtracted from or replaced with a part of a configuration of each embodiment.

In addition, parts or all of the configurations, functions, processing units, processing methods and the like may be implemented by hardware, for example by designing with an integrated circuit, or may be implemented by software, with a processor to interpret and execute a program that implements each function.

Information such as a program, a table, and a file that implements each function can be stored in a storage device such as a memory, a hard disk, and a Solid State Drive (SSD), or a recording medium such as an IC card, an SD card, and DVD.

In addition, control lines and information lines that are considered to be necessary for the description are shown, and not all control lines and information lines that are necessary for mounting are shown. It may be considered that almost all the configurations are actually connected to each other.

REFERENCE SIGN LIST 1 power transmission unit
2 power reception unit
3, 1308 shaft
4 power transmission circuit
5 power transmission coil base
6 power reception coil base
7a, 7b clamp portion
8 power reception circuit
9a, 9b circuit mounting portion
10 support portion
101, 1505, 1412a, 1412b, 1412c power transmission coil
102, 113a, 113b, 113c, 1413a, 1413b, 1413c resonance capacitor
111a, 111b, 111c, 1506, 701a, 701b, 701c, 1422 power reception coil
112 load coil
201 signal source
202 class E amplifier
203, 901 sensor data output terminal
204 receiver
205, 245 antenna
210, 1403 low-pass filter
211, 213, 221, 621 electrostatic capacitor
212, 223, 224 inductor
220, 1424 matching circuit
230, 1425 rectifier circuit
231, 232, 233, 234 rectifier diode
235 smooth capacitor
241, 1426 power supply circuit
242 transmitter
243 AD converter
244 sensor
301, 302, 1501, 1502 input terminal
304, 305, 1503, 1504 output terminal
1507 resonator
600, 601 common mode filter
601a, 601b, 611a, 611b coil transformer
602 data signal request terminal
603 resistor
604a, 604b, 622a, 622b switching element
605 demodulation output terminal
606 demodulation circuit
607a, 607b resistance
623 detector circuit
624 timer circuit
902 control circuit
903 Hall element
904 magnet
1301 main shaft 1302 main shaft head
1303 column
1304 base
1305 table
1306 turntable
1307 arm
1309 chuck
1310 tool
1311 taper portion
1320 tool holder
1321a, 1321b strain gauge
1401 signal source
1402 switching power supply
1411 power supplying coil
1427 battery

The invention claimed is:

1. A power reception unit that receives electric power transmitted from a power transmission unit, the power reception unit comprising:
   a plurality of power reception coils that are configured to receive electric power by magnetic coupling with a power transmission coil of the power transmission unit;
   a load coil that is disposed close to the power reception coils;
   a rectifier circuit connected to the load coil via a matching circuit; and
   a power supply circuit that converts an output of the rectifier circuit, wherein
   a plurality of series resonant circuits that resonate at a frequency equal to a power transmission frequency are constituted by each of the plurality of power reception coils and a resonance capacitor,
   the plurality of series resonant circuits are connected in series in a loop shape,
   the load coil extracts received electric power from the series resonant circuits,
   the power reception unit includes a sensor to which power is supplied from the power supply circuit, and a transmitter that transmits sensor data output from the sensor,
   the power transmission unit includes a receiver that receives the sensor data transmitted from the power reception unit, and
   the power reception unit is configured such that a magnetic flux density generated by the plurality of power reception coils has a constant magnitude in a circumferential direction of a shaft to which the power reception unit is attached,
   the plurality of power reception coils are disposed in a circumferential direction of the shaft and are symmetrical to an axis of the shaft, and
   the power transmission coil is formed on a power transmission coil base in an arc shape in a circumferential direction of the shaft, and a circumferential length of the power transmission coil outside of the power reception coils in a circumferential direction of the shaft covers equal to or less than half of the shaft.

2. The power reception unit according to claim 1, wherein adjacent two power reception coils are disposed close to each other such that directions of currents flowing through adjacent wires of the two power reception coils are opposite to each other.

3. A wireless power transfer device that wirelessly transmits power, the wireless power transfer device comprising:
   a power reception unit that receives electric power transmitted from a power transmission unit, the power reception unit including:
      a plurality of power reception coils that are configured to receive electric power by magnetic coupling with a power transmission coil of the power transmission unit; and
      a load coil that is disposed close to the power reception coils, wherein
      a plurality of series resonant circuits that resonate at a frequency equal to a power transmission frequency are constituted by each of the plurality of power reception coils and a resonance capacitor,
      the plurality of series resonant circuits are connected in series in a loop shape, and
      the load coil extracts received electric power from the series resonant circuits; and
   a power transmission unit including a power transmission coil that supplies power to the power reception unit, wherein
   the power transmission unit includes the power transmission coil that constitutes a series resonant circuit with a resonance capacitor, an amplifier that amplifies a power transmission signal having a predetermined frequency, and a filter that removes a high frequency component downstream of the amplifier, and
   the power transmission unit generates electric power to be transmitted having a frequency equal to a resonant frequency of the series resonant circuit by the amplifier and the filter,
   the power reception unit includes a rectifier circuit connected to the load coil via a matching circuit, and a power supply circuit that converts an output of the rectifier circuit,
   the power reception unit includes a sensor to which power is supplied from the power supply circuit, and a transmitter that transmits sensor data output from the sensor,
   the power transmission unit includes a receiver that receives the sensor data transmitted from the power reception unit, and
   the power reception unit is configured such that a magnetic flux density generated by the plurality of power reception coils has a constant magnitude in a circumferential direction of a shaft to which the power reception unit is attached,
   the plurality of power reception coils are arranged in a circumferential direction of the shaft and are symmetrical to an axis of the shaft, and
   the power transmission coil is formed on a power transmission coil base in an arc shape in a circumferential direction of the shaft, and a circumferential length of the power transmission coil outside of the power reception coils in a circumferential direction of the shaft covers equal to or less than half of the shaft.

* * * * *